US012515329B2

United States Patent
Okumatsu et al.

(10) Patent No.: US 12,515,329 B2
(45) Date of Patent: Jan. 6, 2026

(54) ROBOT CONTROL SYSTEM, ROBOT CONTROL METHOD, AND NON-TRANSITORY STORAGE MEDIUM

(71) Applicant: TOYOTA JIDOSHA KABUSHIKI KAISHA, Toyota (JP)

(72) Inventors: Yoshihiro Okumatsu, Toyota (JP); Hiroshi Bito, Toyota (JP); Akihito Goto, Nagoya (JP); Kazutomo Misao, Toyota (JP); Takemitsu Mori, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 23 days.

(21) Appl. No.: 18/775,000

(22) Filed: Jul. 17, 2024

(65) Prior Publication Data
US 2025/0058466 A1    Feb. 20, 2025

(30) Foreign Application Priority Data
Aug. 15, 2023    (JP) .................................. 2023-132244

(51) Int. Cl.
*B25J 9/16* (2006.01)
(52) U.S. Cl.
CPC .................. *B25J 9/1653* (2013.01)
(58) Field of Classification Search
CPC .............................. B25J 9/1653; B25J 9/1697
See application file for complete search history.

(56) References Cited

U.S. PATENT DOCUMENTS

2010/0114371 A1*    5/2010    Tsusaka ................. B25J 9/0084
700/250

FOREIGN PATENT DOCUMENTS

JP    2021-171900 A    11/2021

OTHER PUBLICATIONS

Buechner et al., "Nonlinear Modeling and Identification of a DC-Motor with Friction and Cogging," IECON 2013—39th Annual Conference of the IEEE Industrial Electronics Society, Nov. 10-13, 2013, Vienna, Austria.

* cited by examiner

*Primary Examiner* — Dylan M Katz
(74) *Attorney, Agent, or Firm* — Oliff PLC

(57) ABSTRACT

A robot control system includes: an impedance control unit configured to, while a robot holding a container with an arm is moving at a first speed, make prediction about displacement of a liquid in the container that occurs when a speed of the robot is changed to a second speed higher than the first speed, and control a magnitude of a first impedance of the arm in a horizontal direction based on a result of the prediction; and a movement control unit configured to change the speed of the robot to the second speed in response to reduction in the first impedance.

12 Claims, 5 Drawing Sheets

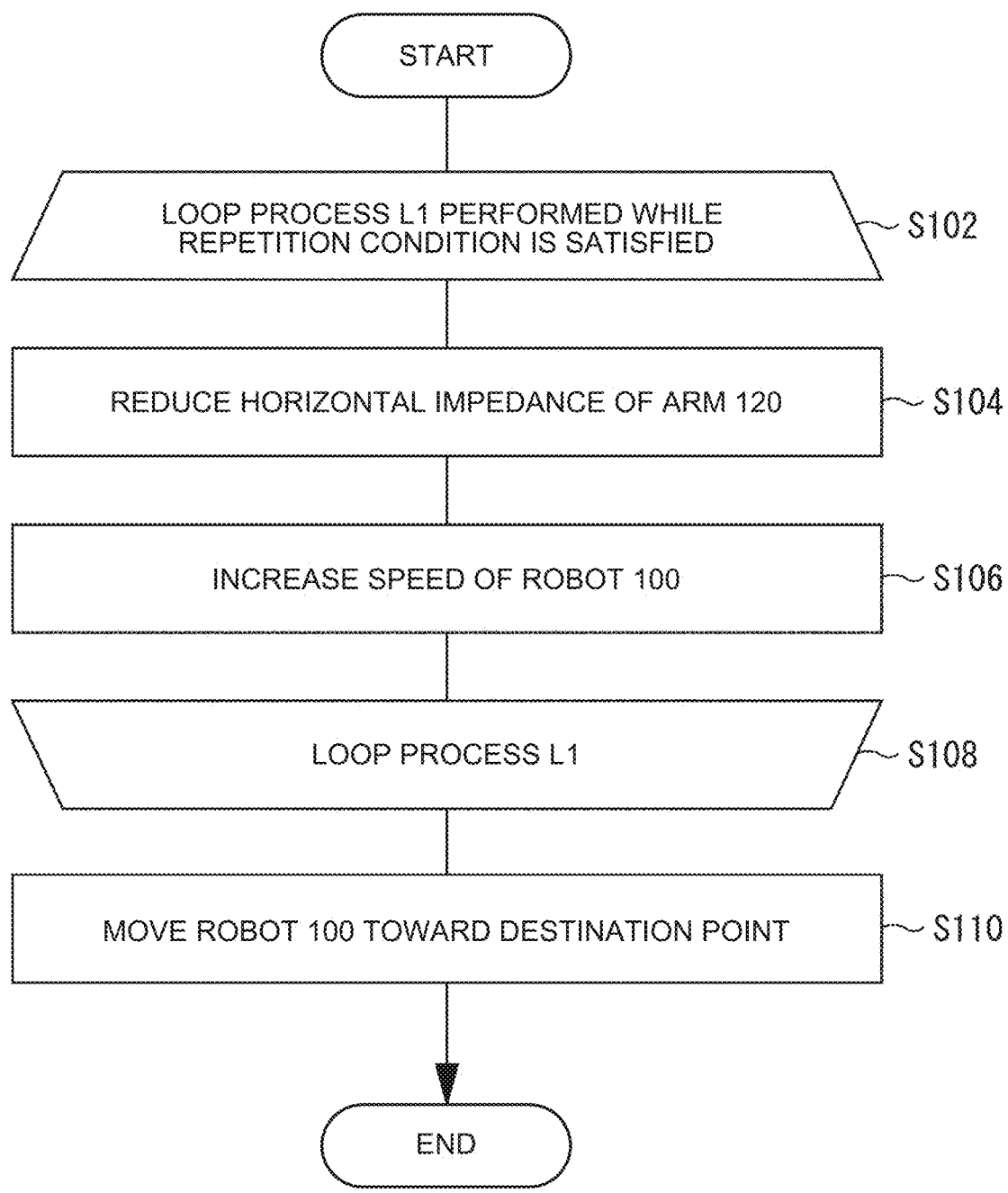

ROBOT CONTROL SYSTEM, ROBOT CONTROL METHOD, AND NON-TRANSITORY STORAGE MEDIUM

CROSS-REFERENCE TO RELATED APPLICATION

This application claims priority to Japanese Patent Application No. 2023-132244 filed on Aug. 15, 2023 incorporated herein by reference in its entirety.

BACKGROUND

1. Technical Field

The present disclosure relates to a robot control system, a robot control method, and a non-transitory storage medium.

2. Description of Related Art

Robots with arms that can hold objects have been developed. For example, Japanese Unexamined Patent Application Publication No. 2021-171900 (JP 2021-171900 A) discloses a robot that can smoothly pass a gripped object to a user.

SUMMARY

JP 2021-171900 A does not mention control on movement of a robot in a case where the robot holds a container containing a liquid. The present disclosure provides a novel technology for controlling movement of a robot holding a container containing a liquid.

A robot control system according to the present disclosure includes: an impedance control unit configured to, while a robot holding a container with an arm is moving at a first speed, make prediction about displacement of a liquid in the container that occurs when a speed of the robot is changed to a second speed higher than the first speed, and control a magnitude of a first impedance of the arm in a horizontal direction based on a result of the prediction; and a movement control unit configured to change the speed of the robot to the second speed in response to reduction in the first impedance.

The impedance control unit may be configured to make prediction as to whether the liquid in the container spills from the container based on the prediction about the displacement of the liquid in the container, and control the magnitude of the first impedance based on a result of the prediction.

The impedance control unit may be configured to reduce the first impedance in response to prediction that the liquid in the container does not spill from the container when the speed of the robot is changed from the first speed to the second speed.

The impedance control unit may be configured to increase the first impedance in response to prediction that the liquid in the container spills from the container when the speed of the robot is changed from the first speed to the second speed.

The movement control unit may be configured to move the robot to a destination point at a current speed in response to a fact that the current speed of the robot is equal to or higher than a target speed or in response to prediction that the liquid spills from the container when the speed of the robot is set higher than the current speed.

The impedance control unit may be configured to predict whether the liquid spills from the container based on a distance between a surface of the liquid and an upper end of the container.

The impedance control unit may be configured to calculate the distance by using a captured image showing the surface of the liquid and the upper end of the container.

The impedance control unit may be configured to determine a magnitude of a second impedance of the arm in a vertical direction based on a weight and a moment applied to the arm.

An amount of reduction in the first impedance may decrease as the speed of the robot increases.

An amount of increase in the speed from the first speed to the second speed may decrease as the speed of the robot increases.

A robot control method according to the present disclosure is executed by a computer. The control method includes: making, while a robot holding a container with an arm is moving at a first speed, prediction about displacement of a liquid in the container that occurs when a speed of the robot is changed to a second speed higher than the first speed; controlling a magnitude of a first impedance of the arm in a horizontal direction based on a result of the prediction; and changing the speed of the robot to the second speed in response to reduction in the first impedance.

A non-transitory storage medium according to the present disclosure stores instructions that are executable by one or more processors and that cause the one or more processors to perform functions including: making, while a robot holding a container with an arm is moving at a first speed, prediction about displacement of a liquid in the container that occurs when a speed of the robot is changed to a second speed higher than the first speed; controlling a magnitude of a first impedance of the arm in a horizontal direction based on a result of the prediction; and changing the speed of the robot to the second speed in response to reduction in the first impedance.

The present disclosure provides the novel technology for controlling the movement of the robot holding the container containing a liquid.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 5 is a flowchart illustrating a flow of a process to be executed by the robot control system of the embodiment.

DETAILED DESCRIPTION OF EMBODIMENTS

An embodiment of the present disclosure will be described in detail below with reference to the drawings. In each drawing, the same or corresponding elements are represented by the same reference signs, and redundant description will be omitted as necessary to clarify the description. Unless otherwise specified, values determined in advance, such as predetermined values and thresholds, are prestored in a storage device etc. accessible to a system or device that uses the values. Unless otherwise specified, a storage unit is constituted by one or more storage devices as desired.

Overview

Figure 1:
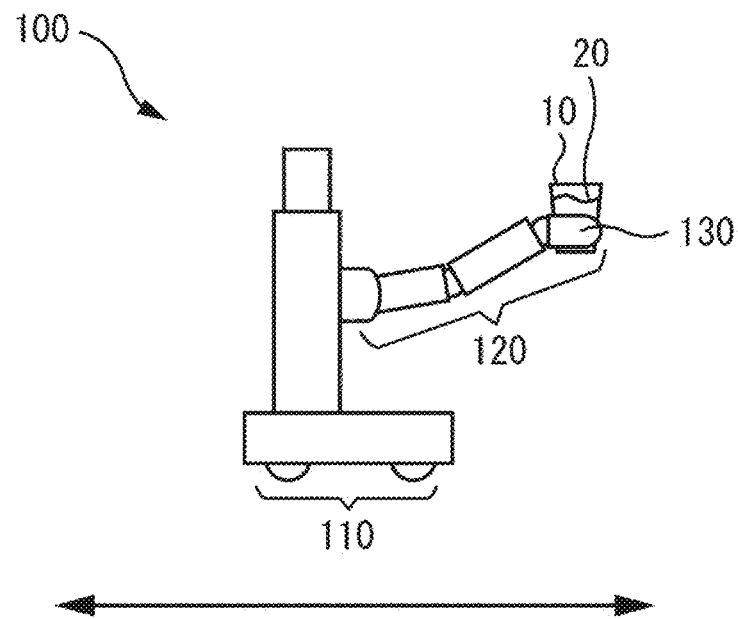
FIG. 1 illustrates an overview of an operation of a robot control system according to an embodiment.
Figure 1:
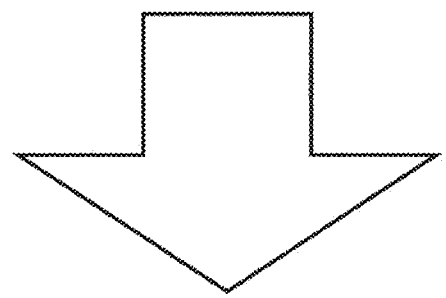
Figure 1:
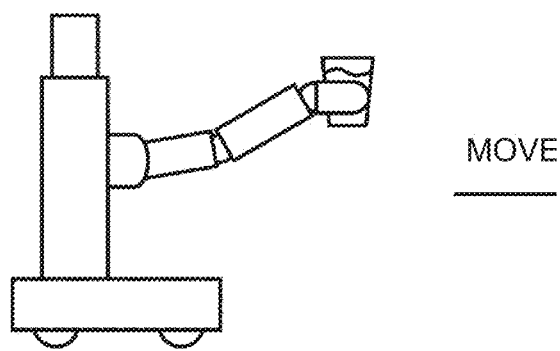

FIG. 1 illustrates an overview of an operation of a robot control system according to the embodiment. FIG. 1 shows an example of the operation of the robot control system. The operation of the robot control system is not limited to the operation shown in FIG. 1. The robot control system may also be called "robot control device".

A robot 100 is controlled by the robot control system. The robot 100 is movable. For example, the robot 100 includes a traveling unit 110 including wheels, caterpillars, etc.

The robot 100 further includes an arm 120. The arm 120 includes a holding portion 130 that can hold an object. For example, the holding portion 130 is configured to grip an object. For example, the holding portion 130 is configured such that an object can be placed thereon.

In the present embodiment, the robot 100 holds a container 10 containing a liquid 20 with the holding portion 130. The container 10 is any container that can contain a liquid, such as a glass, a mug, or a flask. The liquid 20 is any liquid such as water or alcohol. The container 10 is not sealed. Therefore, the liquid 20 may spill from the container 10.

The robot control system moves the robot 100 to a destination point while preventing the liquid 20 from spilling from the container 10 with the container 10 held by the holding portion 130. When a target speed is determined for the robot 100, the robot control system brings the speed of the robot 100 closer to the target speed under the condition that the liquid 20 does not spill from the container 10. When no target speed is determined for the robot 100, for example, the robot control system increases the speed of the robot 100 to the extent possible under the condition that the liquid 20 does not spill from the container 10. Unless otherwise specified, it is assumed that the target speed is determined for the robot 100.

As the horizontal impedance of the arm 120 decreases, the liquid 20 in the container 10 held by the arm 120 further resists vibration caused by acceleration and deceleration along with the movement of the robot 100. Therefore, the liquid 20 is less likely to spill from the container 10 by reducing the horizontal impedance of the arm 120. The horizontal impedance of the arm 120 may be referred to as "first impedance" in the present disclosure.

As the horizontal impedance of the arm 120 decreases, the speed that can be set for the robot 100 decreases. Therefore, the horizontal impedance of the arm 120 needs to be determined also in consideration of the speed of the robot 100. Specifically, it is preferable that the horizontal impedance of the arm 120 be set smaller under the limitation that the robot 100 can move at a desired speed.

Therefore, the robot control system gradually reduces the horizontal impedance of the arm 120 and gradually increases the speed of the robot 100 while moving the robot 100 around a departure point. Thus, the speed of the robot 100 can be increased while preventing the liquid 20 from spilling from the container 10.

More specifically, the robot control system determines whether the speed of the robot 100 has reached the target speed, and predicts displacement of the liquid 20 relative to the container 10 that occurs when the speed of the robot 100 is set higher than the current speed. By predicting the displacement of the liquid 20 relative to the container 10, it is possible to predict whether the liquid 20 will spill from the container 10. Information indicating the target speed of the robot 100 is, for example, prestored in a storage unit accessible to the robot control system.

When the speed of the robot 100 has not reached the target speed and the liquid 20 is predicted not to spill from the container 10 even if the speed of the robot 100 is set higher than the current speed, the robot control system reduces the horizontal impedance of the arm 120. Further, the robot control system increases the speed of the robot 100 from the current speed. When the liquid 20 is predicted to spill from the container 10 if the speed of the robot 100 is set higher than the current speed, the robot control system may increase the horizontal impedance of the arm 120. The upper side of FIG. 1 shows an example of the operation of the robot 100 when the horizontal impedance of the arm 120 is gradually reduced and the speed of the robot 100 is gradually increased while preventing the liquid 20 from spilling from the container 10.

When the speed of the robot 100 has reached the target speed or the liquid 20 is predicted to spill from the container 10 if the speed of the robot 100 is set higher than the current speed, the robot control system moves the robot 100 to the destination at the current speed. The lower side of FIG. 1 shows an example of the operation of the robot 100 that is moved to the destination point at the current speed when the speed of the robot 100 has reached the target speed or the liquid 20 spills from the container 10 if the speed of the robot 100 is increased.

A robot control system 200 of the embodiment will be described in more detail below.

Example of Functional Configuration

Figure 2:
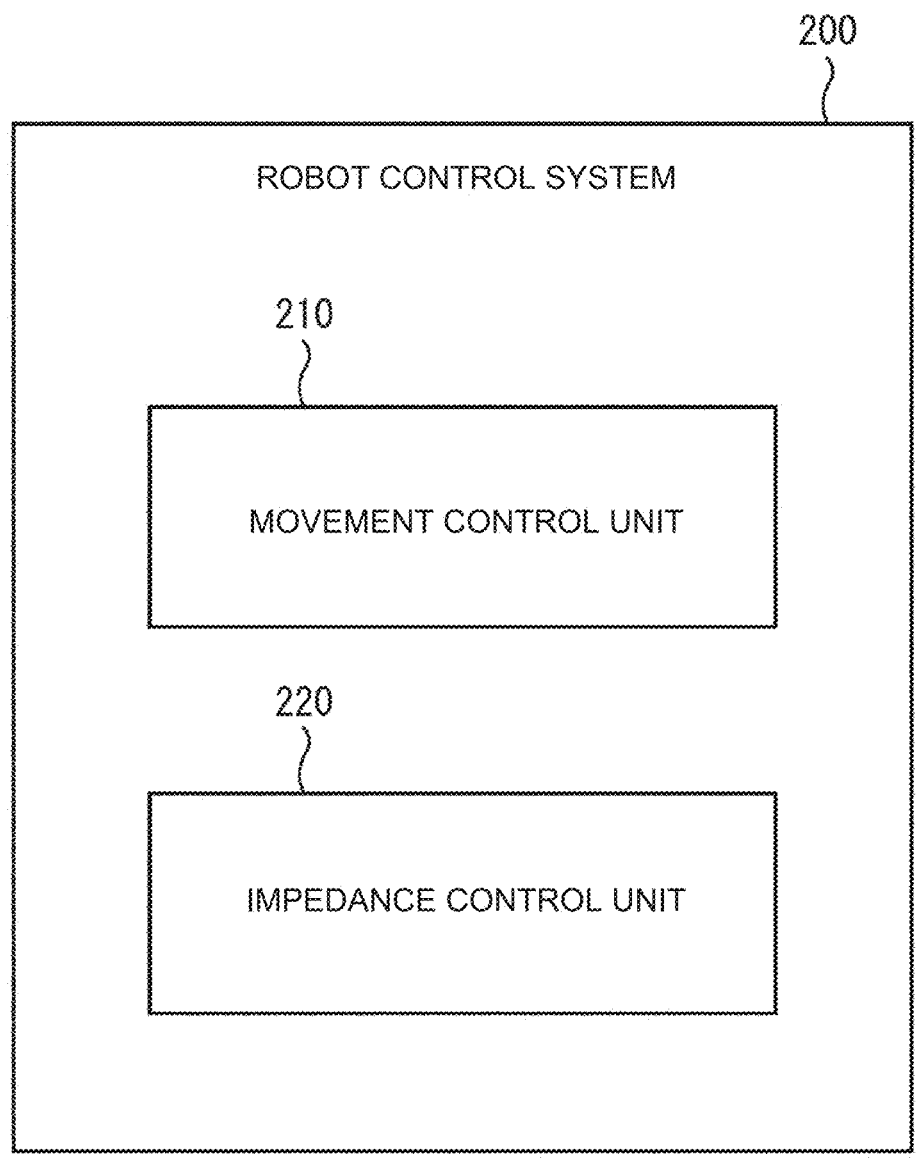
FIG. 2 illustrates the functional configuration of the robot control system.

FIG. 2 illustrates the functional configuration of the robot control system. In the example of FIG. 2, the robot control system 200 includes a movement control unit 210 and an impedance control unit 220. The movement control unit 210 controls the movement of the robot 100. The impedance control unit 220 controls the magnitude of the horizontal impedance of the arm 120.

More specifically, the impedance control unit 220 predicts the displacement of the liquid 20 relative to the container 10 that occurs when the speed of the robot 100 is set higher than the current speed, and controls the horizontal impedance of the arm 120 based on the result of the prediction. For example, when the liquid 20 is predicted not to spill from the container 10 even if the speed of the robot 100 is set higher than the current speed, the impedance control unit 220 reduces the horizontal impedance of the arm 120. The movement control unit 210 sets the speed of the robot 100 to be higher than the current speed in response to the reduction in the horizontal impedance of the arm 120 by the impedance control unit 220.

As described above, a target speed may be determined for the robot 100. In this case, the impedance control unit 220 reduces the horizontal impedance of the arm 120 when the liquid 20 is predicted not to spill from the container 10 even if the speed of the robot 100 is set higher than the current speed, and the speed of the robot 100 is lower than the target speed.

Example of Hardware Configuration of Robot Control System 200

Each functional component of the robot control system 200 may be implemented by hardware that implements each functional component (e.g., a hardwired electronic circuit), or by a combination of hardware and software (e.g., a combination of an electronic circuit and a program that controls it). Further description will be given of a case where each functional component of the robot control system 200 is implemented by a combination of hardware and software.

Figure 3:
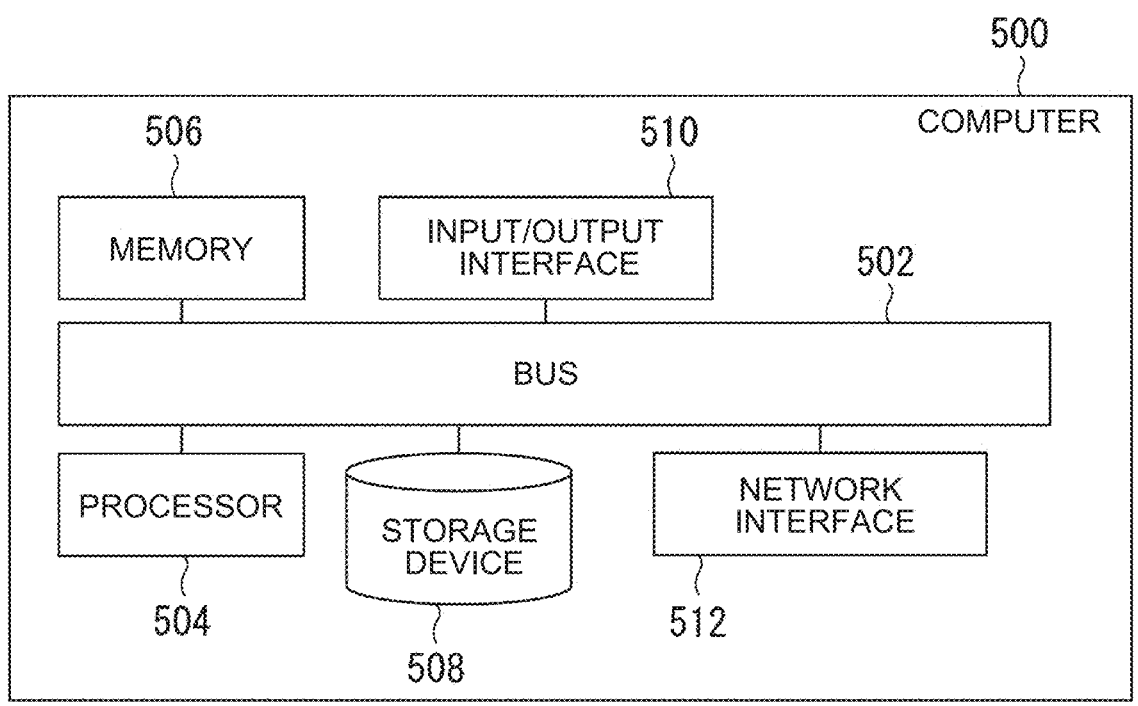
FIG. 3 is a block diagram illustrating the hardware configuration of a computer that implements the robot control system.

FIG. 3 is a block diagram illustrating the hardware configuration of a computer 500 that implements the robot control system 200. The computer 500 is any computer. Examples of the computer 500 include an integrated circuit mounted on the robot 100, and a mobile terminal. Examples of the integrated circuit include a system on a chip (SoC) and a system in a package (SiP). Examples of the mobile terminal include a smartphone and a tablet terminal.

Examples of the computer 500 also include a personal computer (PC), a server machine, and a mobile terminal provided outside the robot 100. When the computer 500 is provided outside the robot 100, the computer 500 controls the robot 100, for example, by communicating with the robot 100 via a network.

The computer 500 may be a dedicated computer designed to implement the robot control system 200, or may be a general-purpose computer.

For example, each function of the robot control system 200 is implemented on the computer 500 by installing a predetermined application in the computer 500. The application is composed of programs for implementing the functional components of the robot control system 200. The programs may be acquired by any method. For example, the programs can be acquired from a storage medium (digital versatile disc (DVD), universal serial bus (USB) memory, etc.) that stores the programs. For example, the programs can be acquired by downloading the programs from a server device that manages a storage device that stores the programs.

The computer 500 includes a bus 502, a processor 504, a memory 506, a storage device 508, an input/output interface 510, and a network interface 512. The bus 502 is a data transmission path through which the processor 504, the memory 506, the storage device 508, the input/output interface 510, and the network interface 512 exchange data with each other. The method for connecting the processor 504 etc. is not limited to the bus connection.

The processor 504 is a variety of processors such as a central processing unit (CPU), a graphics processing unit (GPU), or a field-programmable gate array (FPGA). The memory 506 is a main storage device implemented by using a random access memory (RAM) etc. The storage device 508 is an auxiliary storage device implemented by using a hard disk drive, a solid state drive (SSD), a memory card, a RAM, a read only memory (ROM), etc.

The input/output interface 510 is an interface for connecting the computer 500 and an input/output device. For example, an input device such as a keyboard and an output device such as a display device are connected to the input/output interface 510. For example, various sensors provided in the robot 100 are connected to the input/output interface 510.

The network interface 512 is an interface for connecting the computer 500 to a network. The network may be a local area network (LAN) or a wide area network (WAN).

The storage device 508 stores programs that implement the functional components of the robot control system 200 (programs that implement the application described above). The processor 504 implements the functional components of the robot control system 200 by loading the programs into the memory 506 and executing the programs. A plurality of processors may be used to execute the programs. For example, the storage device 508 may store various types of information necessary for controlling the robot 100, such as the target speed of the robot 100. The storage device 508 is an example of a non-transitory storage medium of the present disclosure, and can store instructions that are executable by one or more processors and that cause the one or more processors to perform functions.

The robot control system 200 may be implemented by one computer 500 or by a plurality of computers 500. In the latter case, the configurations of the computers 500 need not be the same and may be different.

Example of Hardware Configuration of Robot 100

Figure 4:
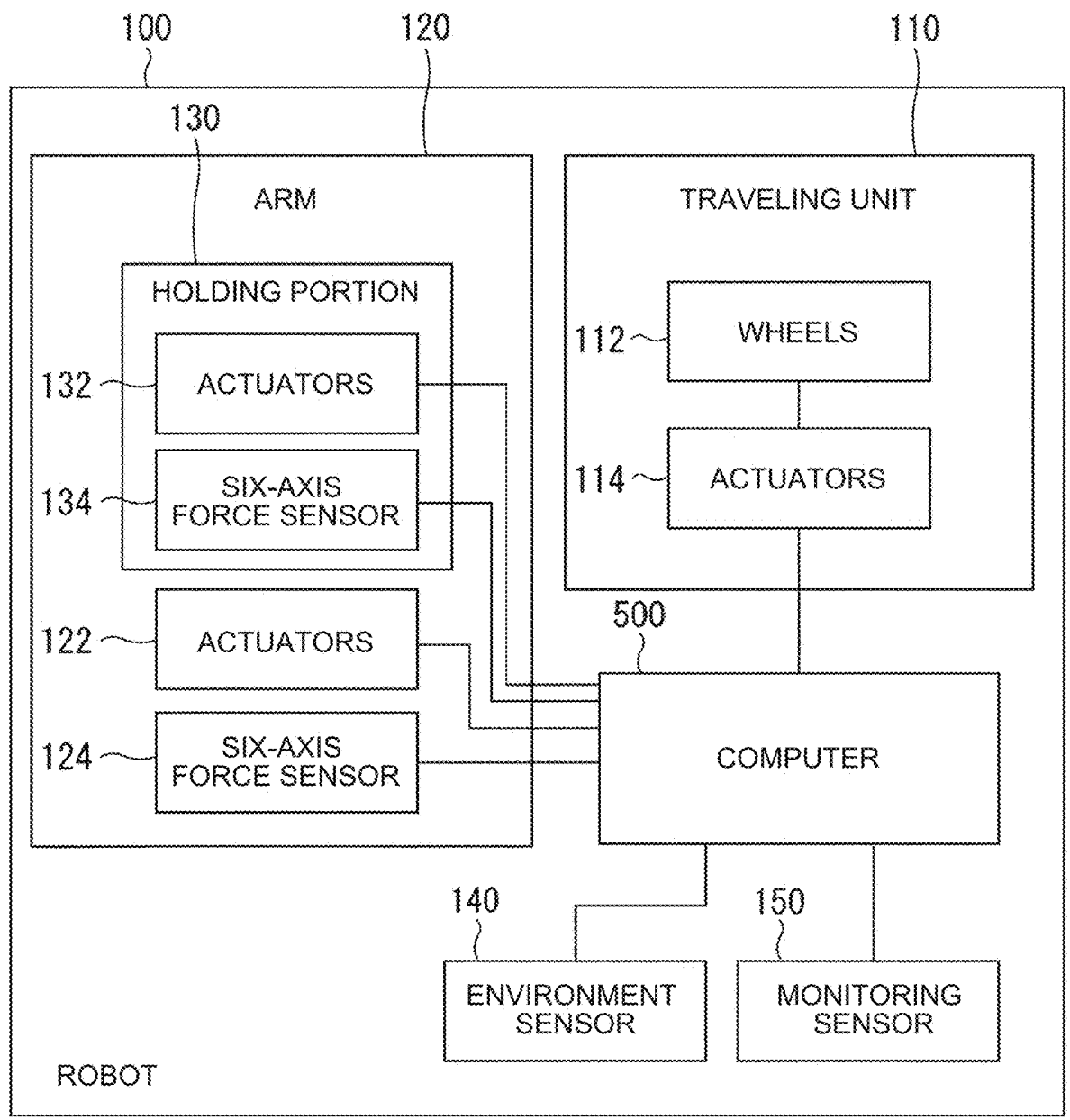
FIG. 4 is a block diagram illustrating the hardware configuration of a robot.

FIG. 4 is a block diagram illustrating the hardware configuration of the robot 100. In the example of FIG. 4, the computer 500 is mounted on the robot 100.

The robot 100 includes the traveling unit 110, the arm 120, an environment sensor 140, a monitoring sensor 150, and the computer 500. The traveling unit 110 is a hardware element for moving the robot 100. For example, the traveling unit 110 includes wheels 112 and actuators 114. The actuators 114 control the directions and rotational speeds of the wheels 112 based on control signals received from the computer 500. Thus, the robot 100 can move in a desired direction and at a desired speed.

The arm 120 is a hardware element for holding an object. The arm 120 includes actuators 122 and a six-axis force sensor 124. The actuators 122 control the operation of the arm 120, the posture of the arm 120, the impedance of the arm 120, etc. based on control signals received from the computer 500. The six-axis force sensor 124 detects loads in directions of three mutually perpendicular axes and moments about the three axes.

The arm 120 further includes the holding portion 130. The holding portion 130 includes actuators 132 and a six-axis force sensor 134. The actuators 132 control the operation of the holding portion 130, the posture of the holding portion 130, etc. based on control signals received from the computer 500. The six-axis force sensor 134 detects loads in directions of three mutually perpendicular axes and moments about the three axes similarly to the six-axis force sensor 124.

The environment sensor 140 is used to sense the environment around the robot 100. Examples of the environment sensor 140 include a camera and a distance measuring sensor. Examples of the distance measuring sensor include a lidar and a depth camera. Sensing data generated by the environment sensor 140 is used, for example, to detect obstacles and estimate the position of the robot 100.

The monitoring sensor 150 is used to monitor the states of the container 10 and the liquid 20. For example, as described later, whether the liquid 20 will spill from the container 10 is predicted based on the distance between the surface of the liquid 20 and the upper end of the container 10. In this case, for example, the monitoring sensor 150 is a camera or a distance measuring sensor having a sensing range including the surface of the liquid 20 and the upper end of the container 10.

Each sensor provided in the robot 100 generates sensing data indicating a sensing result. Each piece of sensing data is transmitted to the computer 500.

Flow of Process

FIG. 5 is a flowchart illustrating a flow of a process to be executed by the robot control system 200 of the embodiment. S102 to S108 constitute a loop process L1. The loop process L1 is repeated while a predetermined repetition condition is satisfied.

When a target speed is determined for the robot 100, the repetition condition is satisfaction of both a first condition that "the displacement of the liquid 20 relative to the container 10 that occurs when the speed of the robot 100 is set higher than the current speed satisfies a predetermined condition" and a second condition that "the speed of the robot 100 is lower than the target speed". When no target speed is determined for the robot 100, the repetition condition is that the first condition is satisfied.

In S102, the impedance control unit 220 determines whether the repetition condition is satisfied. When the repetition condition is satisfied, the impedance control unit 220 reduces the horizontal impedance of the arm 120 (S104). Further, the movement control unit 210 increases the speed of the robot 100 (S106). Since S108 is the end of the loop process L1, the process in FIG. 5 proceeds to S102.

When the repetition condition is not satisfied in S102, the robot control system 200 terminates the execution of the loop process L1. The movement control unit 210 moves the robot 100 toward a destination point at the current speed (S110).

Process before Start of Movement of Robot 100

The robot control system 200 sets the vertical impedance of the arm 120 so that the arm 120 can hold the container 10 horizontally. The robot control system 200 estimates the weight and moment applied to the arm 120 by the container 10. The weight and moment can be estimated by using, for example, sensing data obtained from the six-axis force sensor 134 provided in the holding portion 130. Various known methods can be used as a specific method for estimating the weight and moment applied to the arm of the robot by using the sensing data. The vertical impedance of the arm 120 may be referred to as "second impedance" in the present disclosure.

The robot control system 200 sets the vertical impedance of the arm 120 based on the weight and moment applied to the holding portion 130 so that the container 10 can be kept horizontal. The description "the container 10 is kept horizontal" means, for example, that the top surface of the container 10 is kept horizontal or the bottom surface of the container 10 is kept horizontal.

When only the point that the container 10 is kept horizontal is considered, it is preferable to maximize the vertical impedance of the arm 120. When the vertical impedance of the arm 120 is excessively large, however, it is difficult to move the arm 120 flexibly.

For example, the robot control system 200 reduces the vertical impedance of the arm 120 under the limitation that the container 10 can be kept horizontal. Thus, the arm 120 can move flexibly while keeping the container 10 horizontal.

Various known methods can be used as a specific method for calculating the magnitude of the vertical impedance necessary for keeping horizontal an object held by the arm of the robot based on the weight and moment applied to the arm of the robot.

Determination as to Whether Repetition Condition Is Satisfied: S102

The impedance control unit 220 determines whether the predetermined repetition condition is satisfied (S102). As described above, when a target speed is determined for the robot 100, the repetition condition is satisfaction of both the first condition that "the displacement of the liquid 20 relative to the container 10 that occurs when the speed of the robot 100 is set higher than the current speed satisfies the predetermined condition" and the second condition that "the speed of the robot 100 is lower than the target speed".

The impedance control unit 220 determines whether the speed currently set for the robot 100 (i.e., the speed most recently set for the robot 100 by the movement control unit 210) is lower than the target speed of the robot 100. Thus, determination can be made as to whether the second condition is satisfied.

A method for determining whether the first condition is satisfied will be described below.

As described above, the first condition is that "the displacement of the liquid 20 relative to the container 10 that occurs when the speed of the robot 100 is set higher than the current speed satisfies the predetermined condition". The predetermined condition for the displacement of the liquid 20 is, for example, a condition that is satisfied when the liquid 20 does not spill from the container 10. In this case, the first condition can also be expressed as "the liquid 20 does not spill from the container 10 even if the speed of the robot 100 is set higher than the current speed".

When the speed of the robot 100 is increased, the surface of the liquid 20 is more likely to vibrate. Therefore, there is a high probability that the liquid 20 will spill from the container 10 when the speed of the robot 100 is set higher than the current speed in a situation where the distance between the surface of the liquid 20 and the upper end of the container 10 is short. In other words, there is a low probability that the liquid 20 will spill from the container 10 even if the speed of the robot 100 is set higher than the current speed as long as the distance between the surface of the liquid 20 and the upper end of the container 10 is sufficiently long.

Therefore, a condition about, for example, the relationship between the surface of the liquid 20 and the container 10 is determined as a more specific condition representing the first condition. For example, the first condition is determined as "the distance between the surface of the liquid 20 and the upper end of the container 10 is equal to or larger than a threshold". For example, the first condition is determined as "the ratio of the height of the surface of the liquid 20 to the depth of the container 10 is equal to or smaller than a threshold". The depth of the container 10 can be expressed by the height of the upper end of the container 10 with respect to the bottom surface of the container 10. The height of the surface of the liquid 20 can be expressed with respect to the bottom surface of the container 10.

It is appropriate that the threshold for use in the first condition be determined based on the speed of the robot 100. This is because the distance between the surface of the liquid 20 and the upper end of the container 10 preferably increases as the speed of the robot 100 increases.

Therefore, for example, information in which the speed of the robot 100 is associated with the threshold (hereinafter referred to as "threshold information") is prestored in a storage unit accessible to the impedance control unit 220. The impedance control unit 220 acquires, from the threshold information, a threshold associated with a speed to be subsequently set for the robot 100 by the movement control unit 210.

For example, it is assumed that the current speed of the robot 100 is "s" and the value to be subsequently added to the speed of the robot 100 by the movement control unit 210 is "a". In this case, the impedance control unit 220 acquires a threshold associated with "s+a" in the threshold information. Thus, the robot control system 200 can predict whether the liquid 20 will not spill from the container 10 when the speed of the robot 100 is set to "s+a".

To determine whether the first condition is satisfied, the impedance control unit 220 uses sensing data obtained from the monitoring sensor 150. Examples of the monitoring sensor 150 include a camera. The camera simultaneously images the inner wall of the container 10 and the surface of the liquid 20. The impedance control unit 220 uses a captured image generated as a result of the imaging to calculate a value necessary for the determination on the first condition.

When the first condition that "the distance between the surface of the liquid 20 and the upper end of the container 10 is equal to or larger than the threshold" is used, the value necessary for the determination on the first condition is the distance between the surface of the liquid 20 and the upper end of the container 10. When the first condition that "the ratio of the height of the surface of the liquid 20 to the depth of the container 10 is equal to or smaller than the threshold" is used, the values necessary for the determination on the first condition are the depth of the container 10 and the height of the surface of the liquid 20.

When the surface of the liquid 20 is vibrating, the surface of the liquid 20 is not horizontal. Therefore, the distance between the surface of the liquid 20 and the upper end of the container 10 varies depending on the position. For example, the impedance control unit 220 calculates the distances between the surface of the liquid 20 and the upper end of the container 10 at a plurality of positions, and uses a statistical value (e.g., maximum value or average value) of the calculated distances as the distance between the surface of the liquid 20 and the upper end of the container 10. The same applies to the case where the height of the surface of the liquid 20 is calculated.

When the surface of the liquid 20 is vibrating, the distance between the surface of the liquid 20 and the upper end of the container 10 changes with time. For example, the impedance control unit 220 acquires a plurality of captured images from a camera, and calculates the distances between the surface of the liquid 20 and the upper end of the container 10 for the individual captured images. Then, the impedance control unit 220 uses a statistical value (e.g., maximum value or average value) of the calculated distances as the distance between the surface of the liquid 20 and the upper end of the container 10. The same applies to the height of the surface of the liquid 20.

The distance between the surface of the liquid 20 and the upper end of the container 10 may be calculated by using a machine learning model. In this case, the impedance control unit 220 includes a machine learning model (hereinafter referred to as "calculation model") trained in advance to calculate the distance between the surface of the liquid 20 and the upper end of the container 10.

The calculation model is trained in advance by using a plurality of pieces of training data. The training data includes, for example, a captured image showing the inner wall of the container and the liquid in the container as input data. The training data includes data indicating the distance between the surface of the liquid and the upper end of the container as correct output data (ground-truth data). Various known technologies can be used as a technology for training the machine learning model by using the training data composed of a pair of input data and correct output data.

The monitoring sensor 150 used to grasp the relationship between the upper end of the container 10 and the height of the surface of the liquid 20 is not limited to the camera. For example, the monitoring sensor 150 may be a distance measuring sensor such as a lidar.

Horizontal Impedance Control: S104

When the repetition condition is satisfied, the impedance control unit 220 reduces the horizontal impedance of the arm 120 (S104). For example, the impedance control unit 220 controls the arm 120 to reduce the magnitude of the horizontal impedance of the arm 120 by a predetermined reduction amount "a" from the current value. For example, the impedance control unit 220 controls the arm 120 so that the horizontal impedance of the arm 120 reaches a value obtained by multiplying the current value by a predetermined reduction ratio "b" ($0<b<1$). A known technology can be used as a technology for setting the horizontal impedance of the arm of the robot to a desired value.

The impedance reduction amount "a" and the impedance reduction ratio "b" may or may not be constant values. In the latter case, for example, the impedance control unit 220 reduces the reduction amount "a" and the reduction ratio "b" as the number of times the process for reducing the horizontal impedance of the arm 120 is executed increases. For example, the impedance control unit 220 reduces the reduction amount "a" and the reduction ratio "b" as the current speed of the robot 100 increases. Thus, the horizontal impedance of the arm 120 can be adjusted more finely as the speed of the robot 100 increases (i.e., as the probability that the liquid 20 will spill from the container 10 increases).

Control on Speed of Robot 100: S106

The movement control unit 210 sets the speed of the robot 100 to be higher than the current speed in response to the execution of the process for reducing the horizontal impedance of the arm 120 (S106). For example, the movement control unit 210 controls the speed of the robot 100 so that the speed of the robot 100 is higher than the current speed by a predetermined increase amount "c" ($c>0$). For example, the movement control unit 210 controls the speed of the robot 100 so that the speed of the robot 100 reaches a value obtained by multiplying the current speed by a predetermined increase ratio "d" ($d>1$). A known technology can be used as a technology for setting the speed of the robot to a desired speed.

The speed increase amount "c" and the speed increase ratio "d" may or may not be constant values. In the latter case, for example, the movement control unit 210 reduces the increase amount "c" and the increase ratio "d" as the number of times the process for increasing the speed of the robot 100 is executed increases. For example, the movement control unit 210 reduces the increase amount "c" and the increase ratio "d" as the current speed of the robot 100 increases. Thus, the speed of the robot 100 can be adjusted more finely as the speed of the robot 100 increases (i.e., as the probability that the liquid 20 will spill from the container 10 increases).

Movement to Destination Point: S110

When the speed of the robot 100 has reached the target speed or the liquid 20 is predicted to spill from the container 10 if the speed of the robot 100 is set higher than the current speed, the movement control unit 210 moves the robot 100 to the destination point at the current speed (S110). Various known technologies can be used as a technology for moving the robot to the destination point at the predetermined speed.

For example, the robot control system 200 acquires an environment map prepared in advance and information indicating the position of the destination point on the environment map. The robot control system 200 determines a movement route from the current position of the robot 100 to the destination based on the current position of the robot 100 and the destination point on the environment map. The robot control system 200 moves the robot 100 along the determined movement route.

To move the robot 100 along the determined route, the robot control system 200 uses sensing data obtained from the environment sensor 140 to estimate the position of the robot 100. The robot control system 200 controls the movement direction of the robot 100 based on the current position and the movement route of the robot 100.

The robot control system 200 uses sensing data obtained from the environment sensor 140 to detect an obstacle that is not shown on the environment map. The robot control system 200 corrects the movement route of the robot 100 based on the current position of the robot 100 and the position of the obstacle.

The robot control system 200 may update the environment map by using a technology such as simultaneous localization and mapping (SLAM) while moving the robot 100.

The movement control unit 210 need not always move the robot 100 at a constant speed, and may temporarily decelerate the robot 100 as necessary. For example, the movement control unit 210 decelerates the robot 100 when avoiding collision with an obstacle or passing through a stepped place.

The program includes a set of instructions (or software code) for causing the computer to perform one or more of the functions described in the embodiment when loaded into the computer. The program may be stored in a non-transitory computer-readable medium or a tangible storage medium. Examples of the computer-readable medium or the tangible storage medium include, but are not limited to, a random-access memory (RAM), a read-only memory (ROM), a flash memory, a solid-state drive (SSD), and other memory technologies, a compact disc read-only memory (CD-ROM), a digital versatile disc (DVD), a Blu-ray (registered trademark) disc, and other optical disc storages, and a magnetic cassette, a magnetic tape, a magnetic disk storage, and other magnetic storage devices. The program may be transmitted on a transitory computer-readable medium or a communication medium. Examples of the transitory computer-readable medium or the communication medium include, but are not limited to, propagating signals in electrical, optical, acoustic, or other forms.

The present disclosure is not limited to the above embodiment, and can be modified as appropriate without departing from the spirit and scope of the present disclosure.

What is claimed is:

1. A robot control system comprising:
an impedance control unit configured to, while a robot holding a container with an arm is moving at a first speed, make prediction about displacement of a liquid in the container that occurs when a speed of the robot is changed to a second speed higher than the first speed, and control a magnitude of a first impedance of the arm in a horizontal direction based on a result of the prediction; and
a movement control unit configured to change the speed of the robot to the second speed in response to reduction in the first impedance.

2. The robot control system according to claim 1, wherein the impedance control unit is configured to make prediction as to whether the liquid in the container spills from the container based on the prediction about the displacement of the liquid in the container, and control the magnitude of the first impedance based on a result of the prediction.

3. The robot control system according to claim 2, wherein the impedance control unit is configured to reduce the first impedance in response to prediction that the liquid in the container does not spill from the container when the speed of the robot is changed from the first speed to the second speed.

4. The robot control system according to claim 2, wherein the impedance control unit is configured to increase the first impedance in response to prediction that the liquid in the container spills from the container when the speed of the robot is changed from the first speed to the second speed.

5. The robot control system according to claim 2, wherein the movement control unit is configured to move the robot to a destination point at a current speed in response to a fact that the current speed of the robot is equal to or higher than a target speed or in response to prediction that the liquid spills from the container when the speed of the robot is set higher than the current speed.

6. The robot control system according to claim 2, wherein the impedance control unit is configured to predict whether the liquid spills from the container based on a distance between a surface of the liquid and an upper end of the container.

7. The robot control system according to claim 6, wherein the impedance control unit is configured to calculate the distance by using a captured image showing the surface of the liquid and the upper end of the container.

8. The robot control system according to claim 2, wherein the impedance control unit is configured to determine a magnitude of a second impedance of the arm in a vertical direction based on a weight and a moment applied to the arm.

9. The robot control system according to claim 1, wherein an amount of reduction in the first impedance decreases as the speed of the robot increases.

10. The robot control system according to claim 1, wherein an amount of increase in the speed from the first speed to the second speed decreases as the speed of the robot increases.

11. A robot control method to be executed by a computer, the robot control method comprising:
making, while a robot holding a container with an arm is moving at a first speed, prediction about displacement of a liquid in the container that occurs when a speed of the robot is changed to a second speed higher than the first speed;
controlling a magnitude of a first impedance of the arm in a horizontal direction based on a result of the prediction; and
changing the speed of the robot to the second speed in response to reduction in the first impedance.

12. A non-transitory storage medium storing instructions that are executable by one or more processors and that cause the one or more processors to perform functions comprising:
making, while a robot holding a container with an arm is moving at a first speed, prediction about displacement of a liquid in the container that occurs when a speed of the robot is changed to a second speed higher than the first speed;
controlling a magnitude of a first impedance of the arm in a horizontal direction based on a result of the prediction; and
changing the speed of the robot to the second speed in response to reduction in the first impedance.

* * * * *